Figure 1:
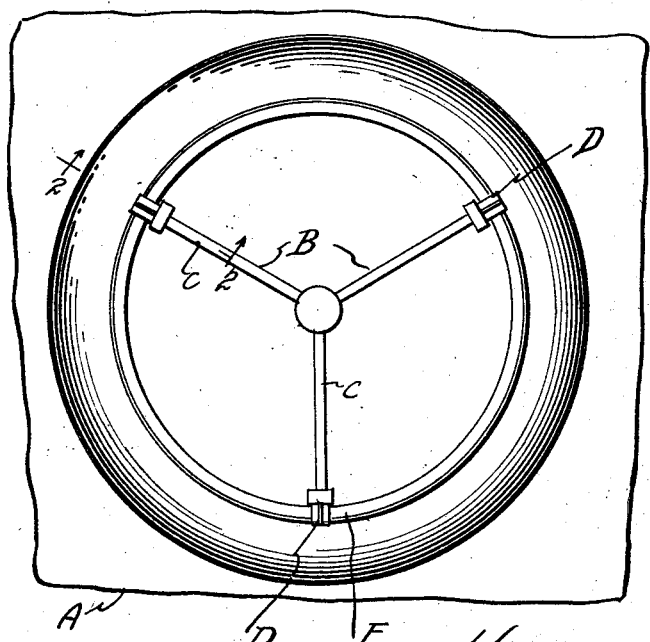

May 11, 1926.

C. M. TRIPP

SPARE RIM HOLDER

Filed Oct. 20, 1923

1,583,905

Inventor
Charles M. Tripp
By William M. Swan
Attorney

Patented May 11, 1926.

1,583,905

UNITED STATES PATENT OFFICE.

CHARLES M. TRIPP, OF DETROIT, MICHIGAN, ASSIGNOR TO TRIPP-SECORD AND COMPANY, OF DETROIT, MICHIGAN, A COMMON-LAW TRUST.

SPARE-RIM HOLDER.

Application filed October 20, 1923. Serial No. 669,665.

This invention relates to spare rim holders for motor vehicles, and has for its object an improved organization of parts by means of which a plurality of such rims may be individually supported in place, generally at the rear of a motor vehicle, in such a way that either can be removed as needed without disturbance of the continued secure holding of the other.

Figure 3:
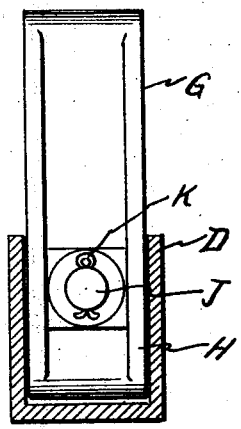
Figure 2:
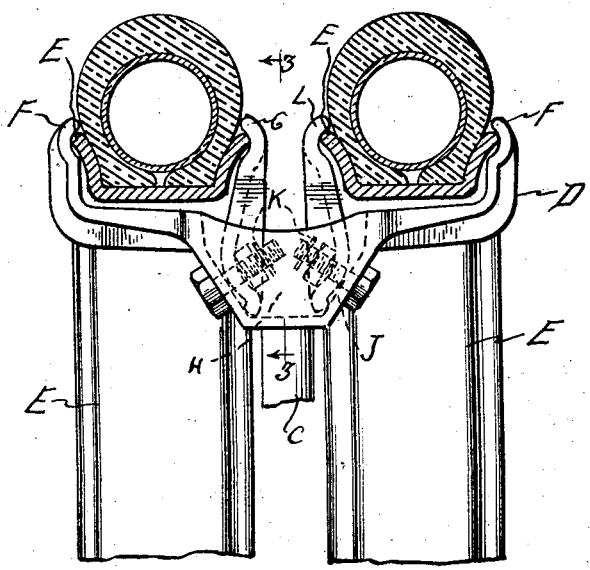

In the drawings:

Figure 1 is an elevational view of the entire device as mounted on the rear end of a vehicle, Figure 2 is an enlarged edge elevational view, taken along the line 2—2 of Figure 1, of one of my rim-clamping devices, with a showing of the corresponding part of the wheel rims held in position thereby, Figure 3 is a partly sectional view, taken along the line 3—3 of Figure 2, through the center of the rim-engaging member, showing one of the movable jaws elevationally.

A represents the rear end of a vehicle body, on which is carried the rim-supporting spider or frame B, which, in view of the firmness with which my device holds the rims in place, may, if desired, be made with only two oppositely disposed radial arms C, instead of the three arms here illustrated and now frequently employed.

At the end of each of the arms C is fixed a rigid holding member D, which extends lengthwise of the vehicle and parallel to the central axis of the wheel rims E and their attached tires as supported thereby. The ends of the rigid member are turned over or hooked, as at F, for engagement about the remote edges of the two rims as arranged side by side and sufficiently spaced from one another to allow for the greater breadth of the tires and also to have their near or adjacent lateral edges engaged by the movable clamping jaws G and L respectively, so as to force each rim into tight engagement with its overbent end F of the rigid holder D. That part of each movable jaw piece G or L which does not engage the wheel rim edge extends into a central pocket or depression H in the top of the holder D, through whose shell extend from beneath the headed screws J, the inner end of each of which passes through the lower end of one of the movable jaws and is locked thereover at its end by some such appropriate means as the cotter pin K. When the screw is turned until the pin K is well clear of that surface of the jaw G against which it engages, the latter is limitedly free and does not anchoringly engage the edge of its wheel rim. When, however, the screw is actuated outwardly, it draws the cotter pin at its inner end against the jaw member, thus clampingly forcing it against the companion inner surface of the holder D, and of course drawing its rim-engaging top portion against the wheel rim, whose possible movement away from the jaw is limited by the engagement against its other edge of the adjacent overturned end F of the holder D. By the proper degree of actuation of the screw J the rim may thus be firmly locked in position, and yet it is easily releasable by reverse movement of the screw J; and the removal or the placing of one rim may be accomplished entirely independently of the other, since each movable jaw is controlled as to its movement by its screw J.

In practice, when, for example, a frame having but two radial arms is employed, I find it preferable, when it is desired to remove a rim, to entirely release one of the holding members, for example the top one, before attempting to release the rim desired from its seizure by the jaws of the lower holder; as already remarked, the rims are so firmly engaged by the jaws of each holder that even with one holder detached, the rims continue in their upright position.

What I claim is:

1. In combination with centrally disposed supporting means, a plurality of rim-engaging fixtures supported thereby, each of said fixtures comprising a rigid holding member provided with inturned ends, a pair of movable rim-engaging elements each adapted to cooperate with one or the other of said inturned ends in the seizure between them of the opposite edges of a wheel rim, and means for effecting the actuation of each of said movable elements independently of the other.

2. In a spare rimholder, in combination with a centrally disposed supporting element, a rim-engaging member provided with inturned ends and with a pair of intermediately disposed movable elements, each adapted to cooperate with its adjacent inturned end piece in seizing the edges of an included wheel rim, and means for regulatably actuating each of said movable elements independently of the other.

In testimony whereof, I sign this specification.

CHARLES M. TRIPP.